Figure 1:
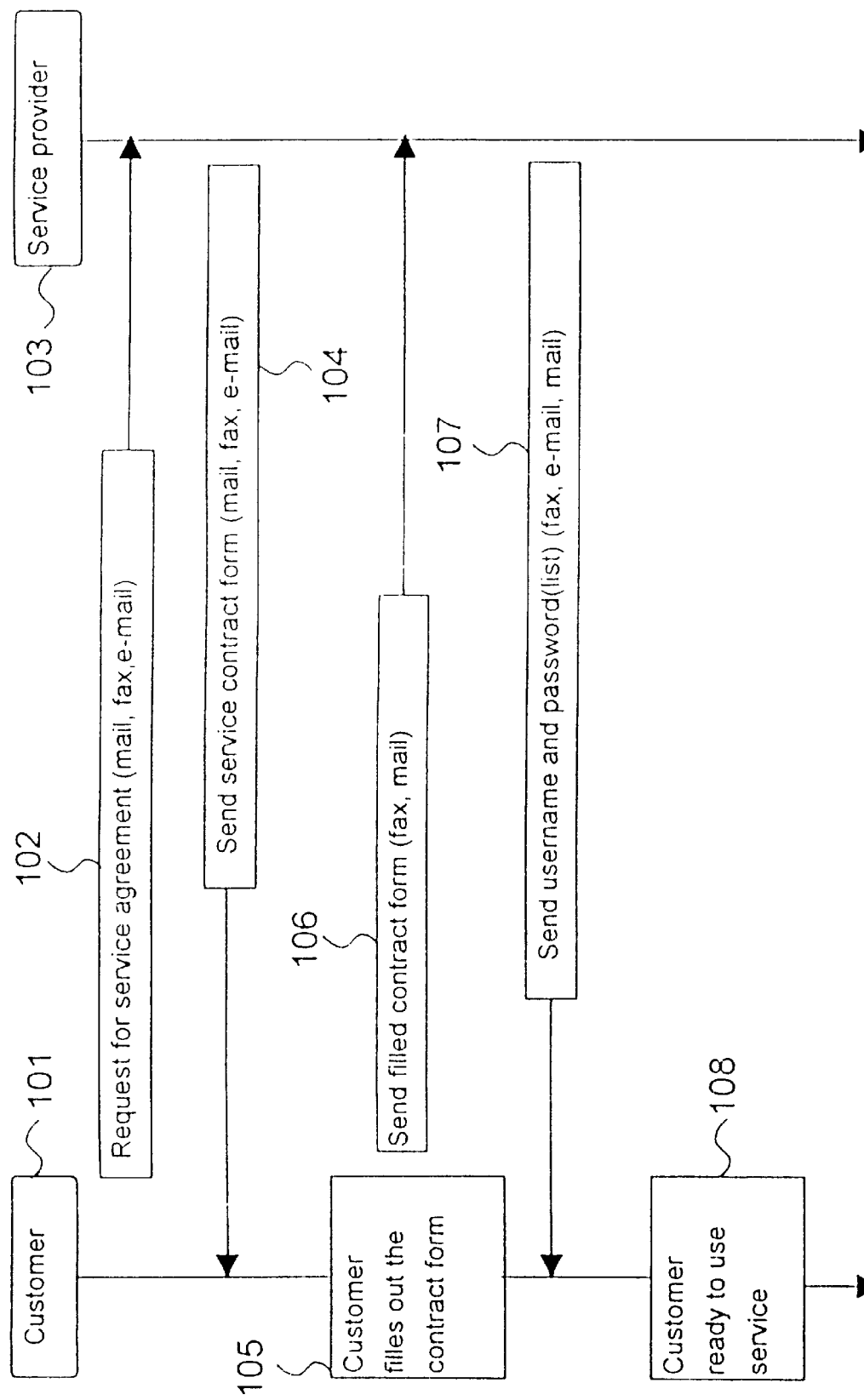

United States Patent

Sormunen et al.

[11] Patent Number: 6,112,078
[45] Date of Patent: *Aug. 29, 2000

[54] METHOD FOR OBTAINING AT LEAST ONE ITEM OF USER AUTHENTICATION DATA

[75] Inventors: Toni Sormunen, Sääksjärvi; Teemu Kurki, Tampere, both of Finland

[73] Assignee: Nokia Mobile Phones, Ltd., Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/803,418

[22] Filed: Feb. 20, 1997

[30] Foreign Application Priority Data

Feb. 23, 1996 [FI] Finland ................................. 960820

[51] Int. Cl.$^7$ .................................................. H04Q 7/20
[52] U.S. Cl. .......................... 455/411; 455/426; 455/466; 380/25
[58] Field of Search .................. 455/411, 466, 455/426; 380/25

[56] References Cited

U.S. PATENT DOCUMENTS

| | | | |
|---|---|---|---|
| 5,175,758 | 12/1992 | Levanto et al. | 455/458 |
| 5,263,178 | 11/1993 | Liukkonen | 455/76 |
| 5,315,634 | 5/1994 | Tanaka et al. | 455/31.2 |
| 5,353,328 | 10/1994 | Jokimies | 379/58 |
| 5,490,235 | 2/1996 | Von Holten et al. | 395/2.79 |
| 5,557,639 | 9/1996 | Heikkila et al. | 375/224 |
| 5,604,921 | 2/1997 | Alanara | 455/45 |
| 5,608,778 | 3/1997 | Partridge | 455/411 |
| 5,668,876 | 9/1997 | Falk et al. | 380/25 |
| 5,794,142 | 8/1998 | Vanttila et al. | 455/419 |

FOREIGN PATENT DOCUMENTS

| | | |
|---|---|---|
| 0722241 A2 | 7/1996 | European Pat. Off. . |
| WO 95/19593 | 7/1995 | WIPO . |
| WO 96/00485 | 1/1996 | WIPO . |

*Primary Examiner*—Daniel S. Hunter
*Assistant Examiner*—Alan T. Gantt
*Attorney, Agent, or Firm*—Perman & Green, LLP

[57] ABSTRACT

A method for obtaining at least one item of user specific data, wherein the user specific data is obtained at least partly by using paging or a short message service.

19 Claims, 3 Drawing Sheets

METHOD FOR OBTAINING AT LEAST ONE ITEM OF USER AUTHENTICATION DATA

The invention relates to a method and system for obtaining at least one item of user specific authentication data, such as a password and/or a user name.

Information services refer in this specification chiefly to electronic information services which can be used by a data processor or the like. For using an information service, a data transmission connection is formed from the data processor to the information service, which is for example an application in the computer of the information service provider. The data transmission connection can be formed for example by using a telecommunication network or a mobile communication network. Upon using an information service, usually user specific authentication data is required, for example a user name and password, which are given with a data processor at the stage when the connection to the information service is formed. The user name and the password enable the information service provider to control the user using the information service, wherein also invoicing can be directed to the users appropriately for example according to usage time. A further object of the user name and the password is to prevent unauthorized use of the information service.

A wide range of services is available for example via the Internet network. Via the network it is possible to make orders and to scan databases and articles. In addition, many banks offer their customers the possibility to pay bills and enquire account transactions using a data processor at home or even at work.

A user name is user specific and it is usually not changed in different connection set-ups. Passwords, on the other hand, can be divided into three main types:

1. One single password valid as long as the user is a registered subscriber to the service. A password of this type is used mainly in services with less need for security.
2. A list of single-connection passwords, each valid for only one connection. For the first connection, the first password is used, for the second connection, the second password is used, etc., as long as all the passwords in the list are used. Subsequently, a new set of passwords has to be ordered before the service can be further used. In some services a new list is sent within a short notice before the last password in the list is used in order to minimize the possible interruption at the list change. Passwords of this type are commonly used with information services provided especially by banks.
3. A periodical password valid for a predefined period of time. This type of password may be used within the period determined for the password regardless of how many times the connection is made. The validity period may be for example a month or a year, after which the password is to be changed into a new one.

Especially when using passwords of the type 2., the problem is that the list has to be kept safe and account of the last used password has to be kept in one way or another. Thus the possibility of abuse is great, especially if the list and the user name are preserved in the same place.

Regardless of which password type is used, it is the user of the service who is to a great extent responsible for data security, and the service provider has few possibilities to prevent and control abuse for example in case the password falls into the wrong hands.

When a new user starts using the information service, the user has to register to the information service provider. This may be done for example by a written subscription request, in which the user gives his or her personal data and other information required, most often by mail, electronic mail (e-mail) or facsimile. In due course, the new user is sent a user name and a password or a list of passwords. These are sent most commonly by mail. In some cases the information may also be sent by facsimile, but in this case it is more likely that the user name and the password fall into the wrong hands. Also electronic mail may be used for informing a user name and a password. However, especially the Internet network is an open network in which the communicated data is in unenciphered form. Furthermore, unauthorized persons can easily read information transferred via the Internet.

In some cases, the user is mailed the information that the user specific authentication data may be dispatched from a post office or bank. In this case the identity of the user can still be checked when the authentication data is despatched.

FIG. 1 shows a flow diagram of a commonly used method for obtaining user specific authentication data. The person (block 101) who wants to become a user of an information service, sends a subscription request (block 102) to the information service provider (block 103). The information service provider sends a subscription form to the user (block 104). Having filled in the form (block 105), the user sends it back to the service provider for example by facsimile or by mail (block 106). The information service provider subsequently handles the form and allots the user the user specific authentication data and sends it for instance by mail, electronic mail or facsimile (block 107). Having received the user specific authentication data, the user can start using the information service (block 108).

For example in the Internet network, some information service providers use a method for registering a new user, whereby the person who intends to become a user, forms a data transmission connection to the Internet address of the service provider. Thus in the display unit of a data processor a subscription form is produced, in which the user may fill in his or her personal data by using the keyboard of the data processor. Information to be filled in include e.g. forename, surname, a proposal for user name and password. After the information has been filled in, the data is saved to be processed in the computer of the service provider. The information service provider handles the information and, when accepting a new user, forms a record or the like for the user, in which the data of the new user is saved. After accepting the new user, the information service provider sends the information of this to the Internet address of the user. Next, the new user may form a connection to the information service. In this method the user may in other words inform the desired password, in which case the information service provider does not send the password with a return message. Also this method includes for example the disadvantage that the user specific authentication data in connection to the subscription request is transmitted via a data network, whereby it is possible that the password and the user name fall into the wrong hands.

The interval between the potential user has sent a subscription request and receives the user specific authentication data is a few days, even weeks. A somewhat shorter delay is reached in situations in which the subscription request can be made via a data processor by contacting the computer of the service provider. Even in cases like this, the handling of the subscription data takes some time, possibly a few days, which means that the using of the service can not be initiated before this.

An object of the present invention is to eliminate the disadvantages disclosed above and to establish a method wherein transmission of user specific authentication data from the service provider to the user of the service can be performed as fast and as safely as possible. The invention is based on the idea that user specific authentication data is transmitted to the user by using, at least partly, a paging system or a short message service. The method according to the invention is characterized in what will be mentioned in the characterizing part of the appended claim 1. The system according to the invention is characterized in what will be mentioned in the characterizing part of the appended claim 13.

The present invention can be applied especially in such telecommunication systems in which it is possible to transmit short messages to a terminal belonging to the telecommunication system on the basis of a terminal key, such as a telephone number. This quality is included in mobile communication systems. In publication TSK 19 "Matkaviestinsanasto" by Tekniikan sanastokeskus (Finnish Center for Technical Vocabulary) a mobile communication system is defined as a telecommunication system composed of a mobile communication network and mobile stations. Mobile communication systems include for example a cellular system, a paging system and a mobile phone system. A cellular system, such as the GSM system, is a mobile communication system in which a cellular network is used. A paging system is a one-way mobile communication system intended for paging. A mobile phone system is a two-way mobile communication system primarily intended for speech transmission. It is advantageous to apply the present system in mobile communication systems which include short message service (SMS) or paging.

The present invention provides considerable advantages over methods of prior art. The method according to the present invention enables very fast subscription, whereby the using of the service may be initiated almost immediately after a subscription request has been sent, because transmission of user information is conducted in enciphered, electronic form and the receiver can be recognized in order to prevent abuse. A further advantage of the fast data transmission is that the validity of passwords can be shortened remarkably and security may thus be improved.

Figure 2:
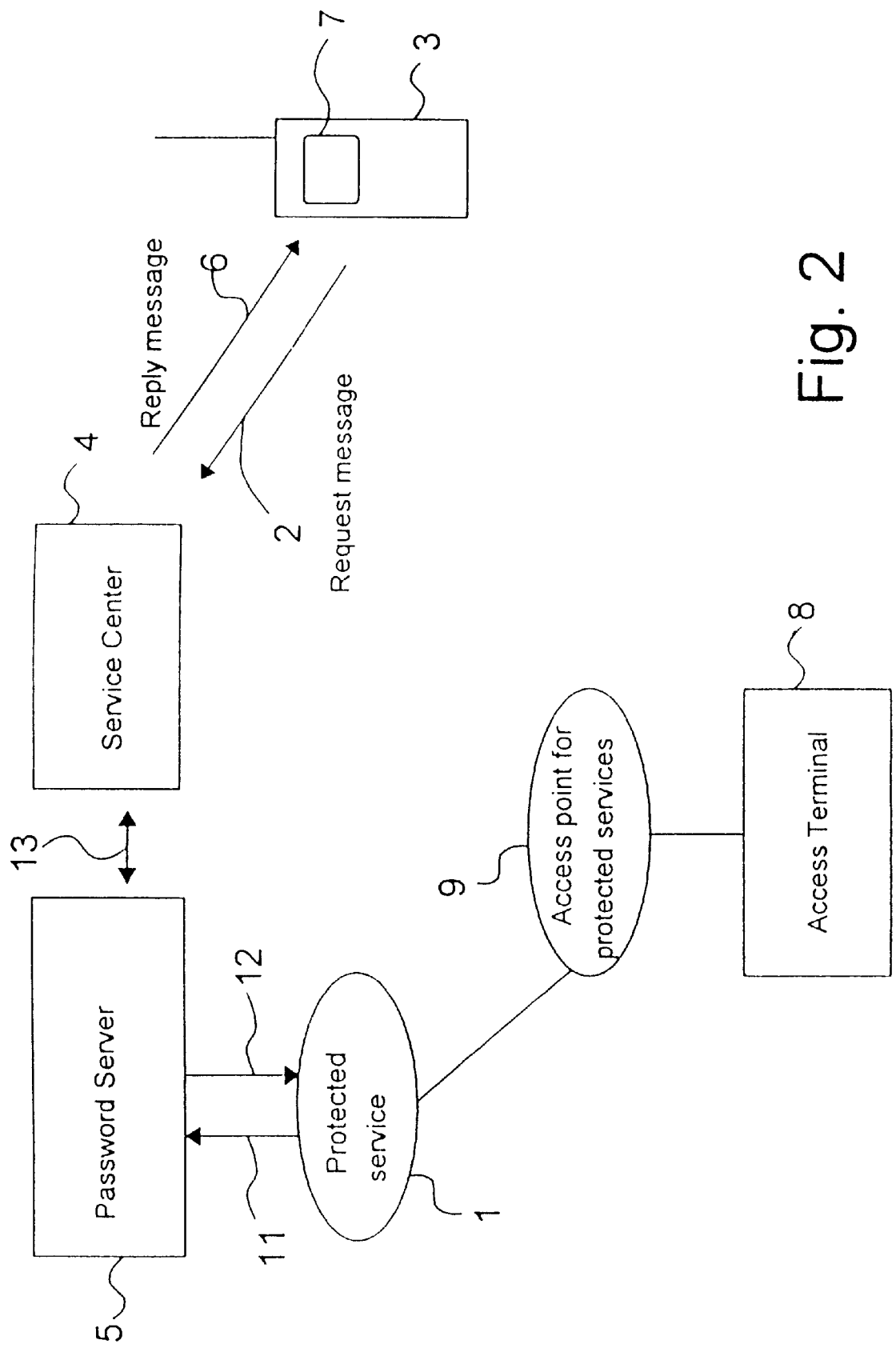
Figure 3:
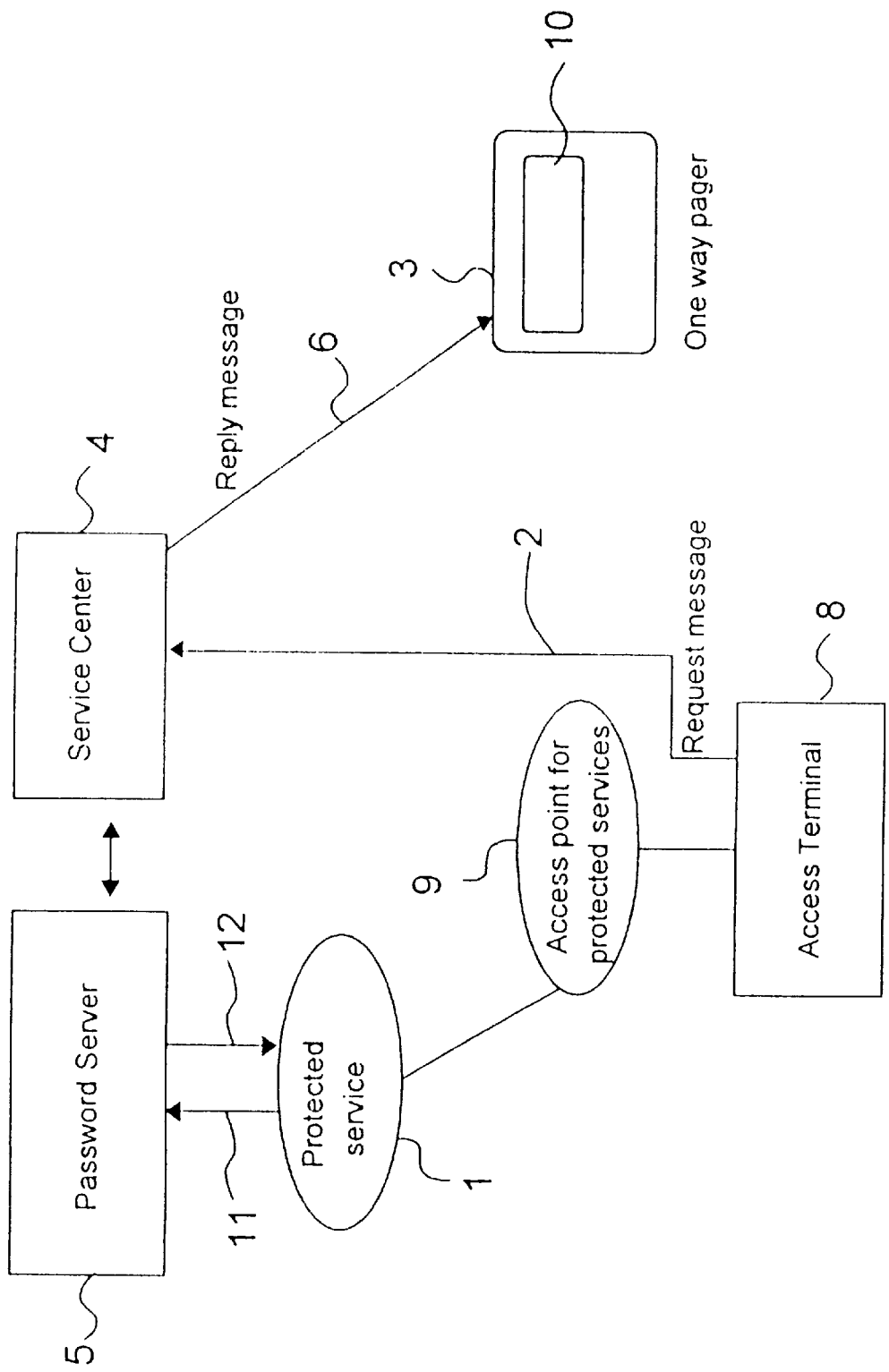

The invention will be described in more detail below with reference to the appended figures, in which FIG. 1 shows a block diagram of a method in transmitting a user name and passwords according to prior art, FIG. 2 shows a method for transmitting a user name and passwords according to a preferred embodiment of the invention, and FIG. 3 shows an alternative embodiment of the invention for transmitting a user name and passwords.

According to a preferred embodiment of the invention illustrated in FIG. 2 a two-way questionnaire of user specific authentication data exhibits only those blocks essential in application of the method. For obtaining the password or the list of passwords required for using a service 1, the user of the service sends a short message 2 from a paging terminal 3, such as a mobile station. The short message 2 includes a password request and possibly also a subscription request for a new user. With the short message from the paging terminal 3, authentication data of the sender is sent to a paging service center 4. The form of the data depends on the type of the message system used. For example the GSM system allows sending short messages, wherein a GSM mobile station can be used in implementation of the method according to the invention. The short messages are transmitted in enciphered form, whereby it is almost impossible for outsiders to decipher the content of the short messages.

In formation of a short message for example a keyboard of a mobile station may be used or the message can also be supplied from the keyboard of a data processor coupled to a mobile station. Further, the message can be sent by forming a data transmission connection to the Internet network, to the so-called WWW (World Wide Web) page of the information service provider, and giving the user authentication data as well as the number of the mobile station, to which the authentication data is transmitted preferably in a short message. Thus the mobile station is not needed in the data inquiry phase.

The paging service center 4 processes the incoming message and forms according to it a data transmission connection to a password server 5 and transmits the inquiry to it. The password server 5 processes the message and forms a reply message containing one or more passwords and the user name in case a new user is registered. The formation of the reply message can be automatic or it can require processing of the information in one way or another, before a password and a possible user name can be admitted. A more detailed processing of this phase depends on the service provider and it is not significant in view of applying the present invention; consequently a more detailed description of the subject is herein unnecessary.

The paging service center 4 is for example in the GSM system advantageously a short message service center.

The password server 5 transmits the password and/or the user name to the short message service center 4, which forms according to the data a reply message 6, which is sent to the paging terminal 3 preferably in enciphered form. The short message service center 4 for example attends to that the short message is sent to the correct paging terminal 3. Herein it is possible to utilize the information in the connection of the message received by the short message service center 4 from the paging terminal 3. The reply message 6 arrived to the paging terminal 3 can be shown to the user for example by the display means 7 of a mobile station used as a paging terminal. The user may subsequently start using the service 1.

In order to be identified the user forms by a data processor 8 a data transmission connection to a verification service 9 of the service 1. After the user has given his or her user name and the valid password, the verification service 9 transmits the given data to the service 1, which sends a check request 11 of the user name and the password to the password server 5. The password server 5 examines the data and communicates in a reply message 12 to the service 1 whether the user name and the password are given correctly. If the data is correct, the user has a data transmission connection from the data processor 8 to the service 1. In case the user name or the password are given incorrectly, the password server 5 communicates this to the service 1, wherein the use of the service 1 is prevented. Furthermore, the password server 5 can give a report to the service provider, which is capable of using this information when controlling possible abuse attempts of the service 1.

The data processor 8 can have a data transmission connection to the mobile station 3. Thus the subscription request can be formed in the application software of the data processor 8, for example in a terminal program. The application software of the mobile station 3 forms a short message 2 on the basis of the subscription data given through the application software of the data processor. In a corresponding manner, the reply message 6 is processed in the application software of the mobile station and transmitted to the data processor 8, whereby the user is given his or her user-specific authentication data for using the information service. The use of the information service can then be started immediately by forming a data transmission connection with the service 1, as described above. The data transmission connection is formed advantageously through a mobile station. An advantage of this method is for example the fact that subscription as a user of the information service can be performed anywhere within the receiving area of the mobile communication network in which the mobile station 3 is connected.

The data transmission connection for using the information service from the data processor 8 can be formed also as a modem connection to a wireline telecommunication network, which is known as such.

The service block 1, the password server block 5 and the verification service block 9 shown in the block diagram of FIG. 2, can be placed for example in the mainframe of the service provider or the like, or they can be separate data processors between which data transmission connections are formed.

The data transmission connection 13 between the short message service center 4 and the password server 5 can be for example a direct connection by using ISDN/LAN (Integrated Services Digital Network/Local Area Network) or a corresponding connection. Also this is prior art known as such. Transmission of short messages between the paging terminal 3 and the short message service center 4 is made preferably at least partly in a wireless manner, for example by using a mobile communication network.

FIG. 3 shows a reduced block diagram of another advantageous embodiment according to the present invention. The difference to the embodiment of FIG. 2 lies primarily in the fact that a paging terminal which is only capable of receiving messages can also be used as the paging terminal 3. In such a case, a subscription request is formed by a data processor 8 and transmitted to a verification service 9. The verification service 9 transmits the received message further to a password server 5. A reply message 6 is formed principally as described in connection with FIG. 2. As the paging terminal 3 in this embodiment, for example a paging device or the like may be used, whereby the method of transmitting the reply message to the paging device depends for example on the paging system used.

In the embodiment of FIG. 3, the paging service center 4 is for example a paging network controller or a wireless messaging switch.

Methods have been developed for transmitting paging messages in connection with radio broadcasting so that they do not interfere with receiving the broadcasting. Thus the paging device includes a receiver which separates from the incoming broadcasting the paging information coded in it and examines whether the transmission is intended to the user of this particular paging device, wherein the paging device forms a signal from the message to the display means 10. The user may consequently form a connection to the service 1 in a corresponding manner as presented in the above description in connection with the embodiment of FIG. 2.

Another possible application of the present invention is that the user makes a call by using a telecommunication terminal, such as a telephone, to the telephone exchange of the information service provider, wherein the user can give the subscription data for example by dictating or tapping the telephone keys. Yet another alternative for sending the subscription request is electronic mail, which is known as such, wherein the data is given to the data processor in the electronic mail application used and transmitted via a telecommunication network or a mobile communication network to the electronic mail address of the information service provider. The transmission of the user specific authentication data to the user is performed by using paging or short message service as presented in connection with the previous embodiments.

Further, the present invention can be applied also for obtaining a personal identity number (PIN) of bank and credit cards and corresponding charge cards. Thus when the charge card is being ordered, the number of the orderer's paging device or mobile station can be given, wherein the supplier of the charge card transmits the personal identity number connected to the charge card to the paging device or the mobile station of the user. Thus it is not necessary to send the identity number by post, which decreases the possibility that the identity number falls into the wrong hands. In a corresponding manner, the method according to the invention can be used for requesting a new personal identity number for a charge card which is already in use, wherein the identity number is transmitted to the paging device or the mobile station of the user.

This may be necessary for example in situations when it is suspected that the identity number has fallen into the wrong hands.

The present invention is not restricted solely to the embodiments presented above, but it can be varied within the scope of the appended claims.

What is claimed is:

1. A method for obtaining at least one item of user specific authentication data, wherein the user specific authentication data is used for forming a connection to an information service having a service provider, which method comprises the steps of:

sending a request for transmission of new user specific authentication data from the user to the information service provider to enable the user to initially form a connection to the information service, processing the request at the service provider to form the new user specific authentication data in accordance with information in the request, sending a reply message including the new user specific authentication data to the user, and receiving the reply message with the user specific authentication data at the user, and wherein the user specific authentication data is obtained at least partly by using paging or a short message service, and further comprising the steps of:

including address information in the request for transmission of the user specific authentication data in accordance with which the reply message is to be sent, and verifying the address information in the reply message before sending the user specific authentication data to the user.

2. The method according to claim 1, wherein the user specific authentication data is sent as a short message which is received by a paging terminal of the user.

3. The method according to claim 2, wherein the request for transmitting the user specific authentication data is sent as a short message.

4. The method according to claim 2, wherein the request for transmitting the user specific authentication data is sent by a method known as such.

5. The method according to claim 4, wherein the request for transmitting the user specific authentication data is made by making a telephone call to the telephone exchange of the information service provider, and making the request by dictating or by voice-frequency signals formed by touching the telephone keys.

6. The method according to claim 1, wherein the user specific authentication data is used in forming a connection to the information service, and which method further comprises:

sending a subscription request from the user to the information service provider, wherein the subscription request comprises one or more items of user specific authentication data, and receiving the subscription data sent by the information service provider, and wherein the user specific authentication data is sent to the information service provider as a short message.

7. The method according to claim 6, wherein a short message is sent by the paging terminal of the user.

8. The method according to claim 1, wherein the user specific authentication data is used in forming a connection to an information service, and which method further comprises:

sending a subscription request from the user to the information service provider, wherein the subscription request comprises one or more items of user specific data, and receiving the subscription data sent by the information service provider, wherein the request for subscription of user specific authentication data is made by making a telephone call to the telephone exchange of the information service provider, and making the request by dictating or using voice-frequency signals formed by touching the telephone keys.

9. The method according to claim 1, wherein the user specific authentication data is used to form a connection to the information service, and which method further comprises:

sending a subscription request from the user to the information service provider, wherein the subscription request comprises one or more items of user specific authentication data, and receiving the subscription data sent by the information service provider, wherein the subscription request is transmitted by using electronic mail or by using the www page of the information service provider.

10. The method according to claim 2, wherein the paging terminal of the user is a mobile station.

11. The method according to claim 10, wherein the mobile station is a cellular system mobile station, such as a GSM mobile station.

12. The method according to claim 10, wherein the mobile station of the user is a paging device, such as a long distance paging device.

13. A system for obtaining at least one item of user specific authentication data, wherein the user specific authentication data is used for forming a connection to an information service having a service provider, which system comprises:

means for sending a request for transmission of new user specific authentication data from the user to the information service provider to enable the user to initially form a connection to the information service, means for processing the request at the service provider to form the new user specific authentication data in accordance with information in the request, means for sending a reply message including the new user specific authentication data to the user, and means for receiving the reply message with the user specific authentication data at the user, and wherein the system further comprises:

means for obtaining user specific authentication data by using at least partly paging or a short message service, means for including address information in the request for transmission of the user specific authentication data in accordance with which the reply message is to be sent, and means for verifying the address information in the reply message before sending the user specific authentication data to the user.

14. The system according to claim 13, wherein the means for obtaining user specific authentication data comprise a paging terminal.

15. The system according to claim 14, wherein the paging terminal is a mobile station.

16. The system according to claim 15, wherein the mobile station is a cellular system mobile station, such as a GSM mobile station.

17. The system according to claim 15, wherein the mobile station is a paging device, such as a long distance paging device.

18. The system according to claim 1, wherein the step of sending a request for transmission of the user specific authentication data from the user to the information service provider comprises sending said request in enciphered form.

19. The system according to claim 13, wherein the means for sending a request for transmission of the user specific authentication data from the user to the information service provider comprises means for sending said request in enciphered form.

* * * * *